United States Patent [19]

Thompson

[11] 4,371,578
[45] Feb. 1, 1983

[54] HEAT SHRINKABLE MATERIAL FOR WRAPPING AROUND A PIPE, CABLE OR THE LIKE

[75] Inventor: Roy F. Thompson, Farnborough Park, England

[73] Assignee: A. C. Egerton Limited, Kent, England

[21] Appl. No.: 172,457

[22] Filed: Jul. 25, 1980

[30] Foreign Application Priority Data

Jul. 27, 1979 [GB] United Kingdom ........... 7926219
Dec. 7, 1979 [GB] United Kingdom ........... 7942237
May 2, 1980 [GB] United Kingdom ........... 8014718

[51] Int. Cl.³ ................... B32B 3/02; F16L 55/16
[52] U.S. Cl. ................... 428/192; 138/167; 138/168; 138/99; 174/DIG. 8; 428/36; 428/99; 428/100
[58] Field of Search ........... 138/99, 167, 168; 174/DIG. 8; 428/36, 99, 100, 192

[56] References Cited

U.S. PATENT DOCUMENTS

| 2,937,664 | 5/1960 | Plummer | 138/56 |
| 3,030,250 | 4/1972 | Losse | 138/149 |
| 3,099,216 | 7/1963 | Jakobsen et al. | 102/22 |
| 3,347,276 | 10/1967 | Dunn | 138/166 |
| 3,467,761 | 9/1969 | Plummer | 174/36 |
| 3,530,898 | 9/1970 | Wilson | 138/99 |
| 3,542,077 | 11/1970 | Muchmore | 138/99 |
| 3,568,308 | 3/1971 | Plaskon | 29/592 |
| 3,574,313 | 4/1971 | Tanaka | 138/99 |
| 3,818,949 | 6/1974 | Johnson | 138/158 |
| 3,982,564 | 9/1976 | Clabburn et al. | 138/110 |

FOREIGN PATENT DOCUMENTS

| 1865759 | 5/1962 | Fed. Rep. of Germany . |
| 1906820 | 10/1964 | Fed. Rep. of Germany . |
| 6905648 | 2/1969 | Fed. Rep. of Germany . |
| 1942340 | 4/1971 | Fed. Rep. of Germany . |
| 2411610 | 9/1974 | Fed. Rep. of Germany . |
| 2600647 | 9/1976 | Fed. Rep. of Germany . |
| 509541 | 8/1971 | Switzerland . |
| 935885 | 9/1963 | United Kingdom . |
| 1155470 | 6/1969 | United Kingdom . |
| 1506242 | 4/1978 | United Kingdom . |
| 1503328 | 8/1978 | United Kingdom . |

Primary Examiner—P. E. Willis, Jr.
Attorney, Agent, or Firm—Fleit & Jacobson

[57] ABSTRACT

A material for wrapping around a pipe, cable or the like in which a flexible sheet of heat shrinkable material such as cross-linked polyolefin, is provided on each edge with a metal clip element. In one construction, the two elements being formed with a body portion attached to the sheet material and hook members which extend in the opposite sense to one another and are inclined towards the body member to hook into one another. A strip of material on one of the clip elements, or on the flexible material, extends under the free edge of one of the hook members to maintain the other hook member in engagement. In another construction the first clip element is provided with spaced apart bridge which are engaged with cooperating spaced apart hooks on the second clip element.

14 Claims, 5 Drawing Figures

HEAT SHRINKABLE MATERIAL FOR WRAPPING AROUND A PIPE, CABLE OR THE LIKE

The present invention relates to material for wrapping around a pipe, cable or the like, for example to seal, against the elements, the joint therein.

British Pat. No. 1,155,470 suggests a heat recoverable closure member which includes heat shrinkable material having ridges or protuberances adjacent two opposite edges. The material is arranged with the adjacent edges in abutting relationship, and a fastening clip is slid over the ridges to maintain the edges in this abutting relationship. Heat is then applied and the heat shrinkable material shrinks so that it clamps tightly around the cable, pipe or the like. Material of this type has the advantage that it can be wrapped around existing cables or pipes and does not have to be fed in from one end. This is of great practical importance when one is wishing to seal a joint between conductors in a cable, for example a telephone cable.

The arrangement, however, has the disadvantage that it is necessary to apply the fastening clip from one end of the ridge and this can be difficult in certain circumstances and when so applied can give rise to damage to the sheathing or coating of adjacent cables and/or pipes.

It is now proposed, according to the present invention, to provide material for wrapping around a pipe, cable or the like, comprising a flexible sheet of material which is heat shrinkable in the direction between first and second opposite edges, a first clip element on said first edge and a second clip element on said second edge, the first and second clip elements being interengageable to hold said first and second edges in proximity, means being provided to maintain said clip elements in interengagement.

In use, the material is wrapped around the pipe or cable or other material to be covered, and the first and second clip elements are interengaged. Since the means are provided to maintain the clip elements in interengagement, there is no need to carry out any other action prior to heating the thus formed sleeve which can then immediately shrink. Thus there is less likelihood of damaging other cables and the whole operation can be carried out rather more quickly than in the previously suggested device of British Pat. No. 1,155,470. Furthermore, since there is no need to have the extra fastening member of that patent, which fastening member is usually made of metal, the heating itself can be carried out more readily, because it has been found that the fastening member forms a heat sink tending to reduce the heat which can be applied to the material particularly in the vicinity of the joint formed between the two edges.

Preferably each clip element comprises a body portion secured to the flexible sheet and a hook member extending from said body portion away from the associated edge, the hook members of the two clip elements being bent in opposite senses and being inclined towards the associated body portion. This inclination facilitates the interengagement of the first and second elements and reduces the possibility of the hook members becoming disengaged once they have been interengaged.

The means which maintain the clip elements in interengagement advantageously comprise a strip extending in front of the free edge of the hook member of one of the clip elements, the hook member of the other clip element being positionable between the strip and the hook member of said one clip, whereby the strip prevents disengagement of the two hook members. This strip may form part of one of the clip elements, or may be formed integrally with the flexible strip.

In other embodiments the means which maintain the clip elements in interengagement may arise from the construction of the clip elements themselves; for example, the clip elements might be so shaped that once brought into engagement they will stay engaged until the sheet is heat shrunk and the tension in the sheet maintains the clips in engagement.

In one such construction the first clip element comprises at least one bridge and the second clip element comprises at least one hook, the or each hook being engageable in a bridge.

Preferably the clip elements comprise elongate strips clamped onto a thickened portion of the flexible sheet material, the two thickened portions extending along the associated edge of the flexible sheet material. This provides a robust connection between the strips and the flexible material.

Advantageously, the thickened portions each project from one surface of the sheet material only, which surface is intended to form the outer surface of the sheet when it is wrapped around a pipe cable or the like. With this arrangement, the thickened portions do not spoil the lie of the material around the cable or pipe. If the hooks extend in a direction outwardly from said one surface, there will be a tendency for them to remain more firmly engaged as the shrinking of the material occurs. In another construction, each clip element is in the form of an elongate strip which extends substantially the full length of its associated edge. In order that the material, when shrunk, can conform closely to the shape of the cable or pipe or the like therewithin, particularly if the material enclosed is of irregular cross-section, it is preferable that the strip should be segmented by lines of weakness extending transverse to the associated edge. This can, for example, be achieved by including slots in the body portions and cuts in the hook members, the slots and cuts being aligned with one another.

In a still further construction, the means provided to maintain the clip elements in interengagement comprise supplementary hook members disposed opposite the hook members of the first clip element, but spaced therefrom by a distance sufficient to permit the hook member of the second clip element to pass between the hook member at the supplementary hook member of the first clip element, the hook member and supplementary hook members of the first clip element being bent in opposite senses to one another to form spaced internal lips.

The body portion can be secured to the flexible material in a number of different ways. For example it can be secured simply by adhesive, by rivets or other similar members, by providing a thickened ridge along the edge of the material engaging in a groove in the body portion or in many other ways which can, advantageously, be effected in the factory. Another method of securing involves providing the body portions with tabs which are bent down from the body portion, passed through the flexible sheet and are bent again to lie substantially flush with the other face of the flexible material. These tabs are advantageously formed in parts of the body portion between each adjacent pair of the slots mentioned above.

The flexible material may be thickened adjacent the first and second edges and the thickening may be of a sufficient amount so that the hooks have a dimension perpendicular to the faces of the sheet material, which is less than the thickness in the thickened portions.

A tongue may be provided to extend from a position adjacent to, but spaced from, one of the opposite edges of the sheet to a location sufficiently beyond the clip element to underlie fully the two clip elements when they are interengaged. This tongue servies to provide a seal at the location of the clip elements.

In order that the invention may more readily be understood, the following description is given, merely by way of example, reference being made to the accompanying drawing in which.

Figure 1:
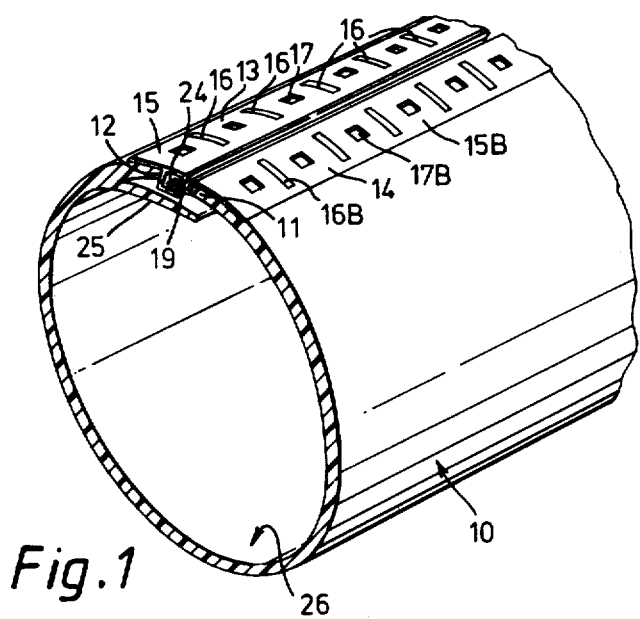
FIG. 1 is a perspective view of one embodiment of material according to the present invention shown in its assembled condition.

Referring first to FIG. 1 there is illustrated a sheet 10 of heat shrinkable material, such as cross-linked polyolefine, having edges 11 and 12. The heat shrinkable material is arranged so that, when heated, it will shrink so that the distance, along the sheet material, between the edges 11 and 12 will reduce.

Two elongate strip material clip elements 13 and 14 are shown secured to the edges 12 and 11 respectively. The strip material 13 has a body portion 15 provided with a series of parallel slots 16 punched out from the body portion. Between adjacent slots 16 are formed apertures 17 again punched from the body portion 15, but having a tab 18 folded down from one edge thereof as can be seen more clearly in FIG. 2.

Figure 2:
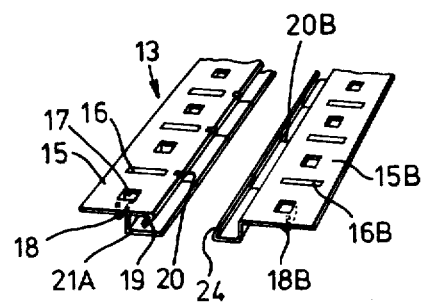
FIG. 2 is a perspective view of the two clip elements prior to mounting on the flexible sheet material.

The body portion 15 has extending beyond the edge 12 a hook member 19 which is bent downwardly at an angle of less than 90° so that it is inclined back towards the body portion. As can be seen from FIG. 2, the hook member 19 is segmented by cuts 20 which are aligned with the slots 16. In FIG. 1, edge 12 of the sheet of heat shrinkable material 10 has an integral tongue 25 which passes under the clip element 14. FIG. 2 shows the foot like strip 21A formed integrally with the body 15 and which passes under the hook member 24 of the second clip element 14 and serves to ensure that the clip elements are maintained in interengagement until the material 10 is heat-shrunk.

The second clip element 14 is of similar construction having similar slots 16B and apertures 17B providing tabs 18B (FIG. 2). Strip 14, however, has a hook member 24 which is complementary to hook member 19 in that it extends in the opposite sense, i.e. upwardly, and is again inclined at an angle of less than 90° so that it extends back towards the body portion 15B of the second clip element 14. Again cuts 20B are provided aligned with the slots 16B.

The material is assembled by pushing the tabs 18, 18B through the sheet material 10 adjacent the edges 12, 11, and then bending the tabs back so that they lie substantially flush with the opposite face of the sheet material 10. Many other forms of securing are contemplated, as mentioned earlier.

A fly tongue 25 is provided on the sheet material 10 to extend from a location spaced from the edge 12 or from edge 11 to a position beyond the two clip elements when they are interengaged to seal the pipe wrapping. The function of the strip 21A may instead be performed by a strip on either edge of the sheet material 10 or the tongue 25 may serve both this function and its sealing function. As mentioned above, in some embodiments the means provided to maintain the clip elements in interengagement may arise from the construction of the clip elements themselves; in those circumstances, if a sealing effect is not required, tongue 25 may be omitted.

In use, the sheet material 10 is wrapped around the cable, pipe, joint etc. and the two clip elements are interengaged either simply by pushing them towards one another, with the inclined hooks 19, 24, having their outer faces abutting and thereby pushing down the strip 21A or by bending the flexible material slightly inwardly so that the hooks can be slipped into engagement whereafter the sheet material is brought to the position illustrated in FIG. 1.

In either event, once interengaged as shown in FIG. 1, the hooks will not disengage because of the presence of the strip 21A. Thereafter, the material as a whole is heated and the heat shrinkable sheet 10 shrinks and tightly clasps around the pipe, cable, joint etc. Hot melt or other adhesive linings may be provided on the inner surface 26 and mastik or other fillers may be introduced.

While the clips can be made of any suitable material, a metal is preferred such as a plated copper alloy or stainless steel.

It has been found that by heating around the strips 13, 14, the material of the sheet 10 will well up through the apertures 17 (and also the apertures 16) and start to flow outwards over the upper surfaces of the strips 13, 14, so as to form heads above the surfaces with necked down portions extending through the apertures in the strips. It has been found that these projections through the material sustain the majority of the circumferential tension when sheet 10 is heat-shrunk. In view of this, if the projections are formed during heat shrinking, whatever other means are used to secure the strips 13 and 14 to the sheet 10 prior to heat-shrinking need not be capable of sustaining the circumferential tension. Thus, for example, the tabs 18, 18B may be omitted. For the purpose of enabling suitable projections to form, the apertures in the strips 13 and 14 are preferably between about 2 and 5 mm across in the direction along the strips.

Figure 3:
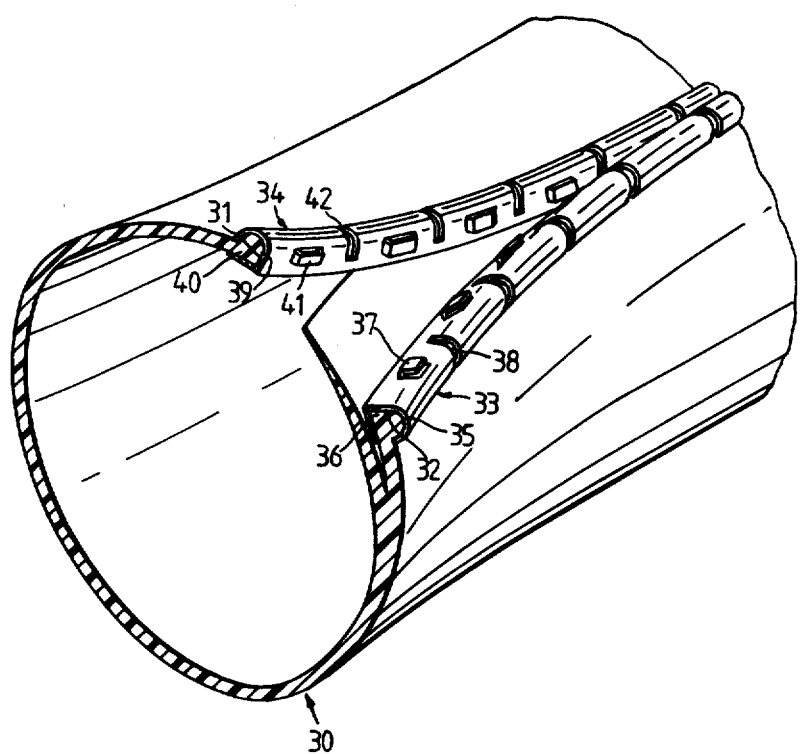
FIGS. 3 and 4 are perspective views of a second and third embodiment of material according to the invention.

Referring now to FIG. 3, there is illustrated a further sheet 30 of heat shrinkable material, such as cross-linked polyolefin, having edges 31 and 32. The heat shrinkable material is arranged so that, when heated, it will shrink so that the distance, along the sheet material, between the edges 31 and 32 will reduce.

Two elongate strip material clip elements 33 and 34 are shown secured along the edges 32 and 31 respectively. The clip element 33 has a body portion 35 which is folded around a thickened portion 36 provided at the edge 32 of the flexible material. A series of outwardly projecting, spaced apart hooks 37 are punched out of the body portion 35 at locations facing the clip element 34. Between adjacent hook elements a series of parallel slots 38 are punched out of the strip material. The clip element 34 is of generally similar construction, with a body portion 39 folded around a thickened portion 40 of the flexible material, and having slots 42 substantially opposite slots 38. Between adjacent slots 42, and directly opposite hooks 37, bridges 41 are punched out of body portion 39 and are of a size to accommodate the associated hooks 37.

A fly tongue 45 is provided on the sheet material 30 to extend from a location spaced from the edge 32, or from the edge 31, to a position beyond the two clip elements when they are interengaged to seal the pipe wrapping.

The material is used in a similar way to that described above, but the clip elements are secured to one another by inserting the hooks 37 into the bridges 41. If desired the hooks could be slightly bowed to help to return them resiliently in the bridges, but this is not necessary if the hooks and bridges are dimensioned correctly relative to one another.

As heat is applied to the material 30, it shrinks. Since the thickened portions 36, 40 are located outwardly of the outer surface of material 30, they do not disturb the shape of the "tube" formed by the material. As the shrinking is completed, the bridges 41 and the hooks 37 engaged therein will take up a slightly divergent configuration, so that any tendency for them to disengage is greatly reduced.

Figure 4:
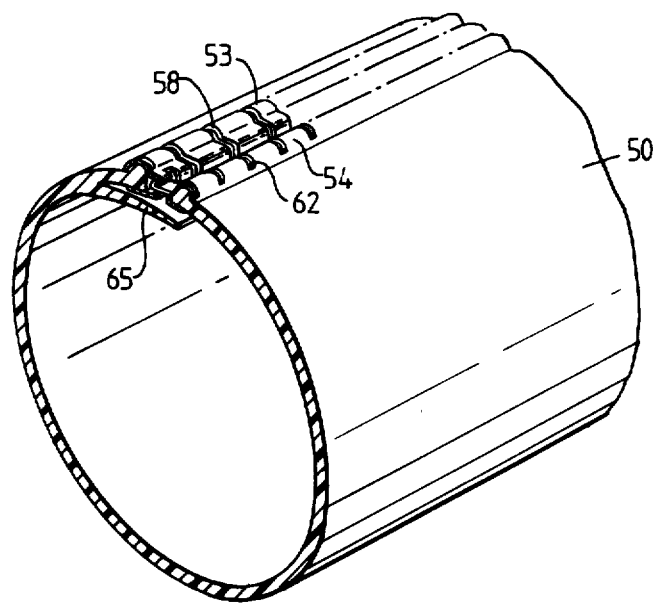
Figure 5:
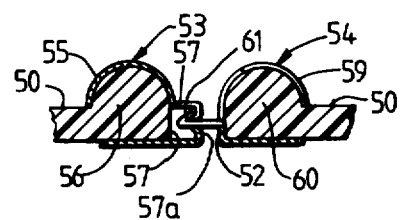
FIG. 5 is an enlarged detailed section of the FIG. 4 construction.

The construction of FIGS. 4 and 5 show a presently preferred further embodiment which comprises many of the features of the first and second embodiments. A sheet 50 of heat-shrinkable material, having edges 51 and 52 have been arranged so that it will shrink, when heated, along the direction between the edges 51 and 52. Two elongate strip material clip elements 53 and 54 are secured along the edges 52 and 51, the clip element 53 having a body portion 55 which is folded around the thickened portion 56 provided at the edge 52 of the flexible material. A series of inwardly projecting, spaced apart, hooks 57 are punched out of the body portion 35 at locations facing the clip element 54. Supplementary hook members 57a, which are outwardly projecting, are also punched out of the body portion 55 at locations opposite to, but spaced apart from, the hook members 57. Between adjacent pairs of hook elements 57, 57a, are a series of parallel slots 58 punched out of the strip material.

The clip element 54 is of generally similar construction, with a body portion 59 folded around the thickened portion 60 of the flexible material, and having slots 62 substantially opposite slots 58. Between adjacent slots 62 and directly opposite the hook members 57, 57a, further outwardly projecting spaced apart hook members 61 are punched out of the body portion 59 and are of a size to enable them to be passed, with some force, between the associated hooks 57 and supplementary hook members 57a.

A fly tongue 65 is provided on the sheet material at 50 to extend from a location spaced from the edge 52, or from the edge 51, to a position beyond the two clip elements when they are interengaged to seal the pipe wrapping.

The material is used in a similar way to that described above, but the clip elements are secured to one another by inserting the hook members 61 between the hooks 57 and the supplementary hook members 57a, which flex slightly to enable the hook members 61 to pass therebetween, but they spring back to hold the clips 61 in place so that they cannot readily be removed. The subsequent operation is as previously described.

I claim:

1. Material for wrapping around a pipe, cable or the like, comprising a flexible sheet of material, first and second opposite edges of said material, said material being heat-shrinkable in a direction between first and second opposite edges, a first clip element secured on said first edge and a second clip element secured on said second edge, the first and second clip elements each comprising a body portion secured to the flexible sheet and a hook member extending from said body portion away from the associated edge, the hook members of the two clip elements being bent in opposite senses and being inclined towards the associated body portion, whereby the hook elements are inter-engageable to hold said first and second edges in proximity and means to maintain said clip elements in inter-engagement.

2. Material as claimed in claim 1, and further comprising thickened portions extending longitudinally of the sheet of material adjacent each of said opposite edges wherein the clip elements comprise elongate strips each clamped onto one of said thickened portions of the flexible sheet material.

3. Material as claimed in claim 2, wherein the thickened portions each project from one surface of the sheet material only, which surface is intended to form the outer surface of the sheet when it is wrapped around a pipe cable or the like.

4. Material as claimed in claim 3, wherein said at least one hook extends in a direction outwardly from said one surface of the sheet material.

5. Material as claimed in claim 2, and further comprising means defining lines of weakness on each elongate strip extending transverse to the associated edge, effective to segment said strip.

6. Material as claimed in claim 1, wherein the means provided to maintain the clip elements in interengagement comprises a strip extending in front of the free edge of the hook member of one of the clip elements, the hook member of the other clip element being positionable between the strip and the hook member of said one clip element, whereby the strip prevents disengagement of the two hook members.

7. Material as claimed in claim 6, wherein the strip forms a part of said one clip element.

8. Material as claimed in claim 1, wherein each clip element is in the form of an elongate strip extending along substantially the full length of the associated edge.

9. Material as claimed in claim 8, and further comprising means defining slots in the body portions extending transverse to the associated edge, and cuts in the hook members, the slots and cuts being aligned, effective to segment said elongate strip.

10. Material as claimed in claim 1, and further comprising tabs bent down from the body portion, passed through the flexible sheet and bent again to lie substantially flush with the other face of the flexible sheet material, effective to secure the body portions to the flexible sheet material.

11. Material as claimed in claim 1, wherein the means provided to maintain the clip elements in interengagement comprise supplementary hook members disposed opposite the hook members of the first clip element, but spaced therefrom by a distance sufficient to permit the hook member of the second clip element to pass between the hook member and the supplementary hook member of the first clip element, the hook member and supplementary hook members of the first clip element being bent in opposite senses to one another to form spaced internal lips.

12. Material for wrapping around a pipe, cable or the like, comprising a flexible sheet of material, first and second opposite edges of said sheet material, said material being heat shrinkable in the direction between said first and second opposite edges, a first clip element secured on said first edge and a second clip element secured on said second edge, the first and second clip elements each comprising a body portion secured to the flexible sheet and a hook member extending from said body portion away from the associated edge, the hook members of the two clip elements being bent in opposite senses and being inclined towards the associated body portion, whereby the hook members of the two clip elements are interengageable to hold said first and second edges in proximity, and a strip extending in front of the free edge of the hook member of one of the clip elements, the hook member of the other clip element being positionable between the strip and the hook member of said one clip element, whereby the strip prevents disengagement of the two hook members.

13. Material for wrapping around a pipe, cable or the like, comprising a flexible sheet of material, first and second opposite edges of said sheet material, said material being heat shrinkable in a direction between said first and second opposite edges, a first clip element secured on said first edge a second clip element secured on said second edge, the first and second clip elements each comprising a body portion secured to the flexible sheet and a hook member extending from said body portion away from its associated edge, the hook members of the two clip elements being bent in opposite senses and being inclined towards the associated body portion, supplementary hook members disposed opposite the hook members of the first clip element, but spaced therefrom by a distance sufficient to permit the hook members of the second clip element to pass between the hook members and the supplementary hook members of the first clip element, the hook members and the supplementary hook members of the first clip element being bent in opposite senses to one another to form spaced internal lips, whereby the hook members of the first and second clip elements are interengageable to hold said first and second edges in proximity and whereby said supplementary members maintain hook members of the first and second clip elements in interengagement.

14. Material as claimed in claim 13 and further comprising thickened portions extending longitudinally of the sheet of material adjacent each of said opposite edges and wherein the clip elements comprise elongate strips each clamped onto one of said thickened portions of the flexible sheet material.

* * * * *